United States Patent
Cohen et al.

(10) Patent No.: US 11,335,207 B2
(45) Date of Patent: May 17, 2022

(54) REFRESHABLE BRAILLE DISPLAY

(71) Applicant: Beacon Street Innovations, LLC, Bexley, OH (US)

(72) Inventors: Douglas Jay Cohen, Columbus, OH (US); Thor Leif Hendrickson, London (GB)

(73) Assignee: BEACON STREET INNOVATIONS, LLC, Bexley, OH (US)

( * ) Notice: Subject to any disclaimer, the term of this patent is extended or adjusted under 35 U.S.C. 154(b) by 490 days.

(21) Appl. No.: 16/478,684

(22) PCT Filed: Feb. 20, 2018

(86) PCT No.: PCT/US2018/018674
§ 371 (c)(1),
(2) Date: Jul. 17, 2019

(87) PCT Pub. No.: WO2018/156475
PCT Pub. Date: Aug. 30, 2018

(65) Prior Publication Data
US 2019/0385483 A1    Dec. 19, 2019

Related U.S. Application Data

(60) Provisional application No. 62/461,881, filed on Feb. 22, 2017.

(51) Int. Cl.
*G09B 21/00* (2006.01)
*G09B 21/02* (2006.01)
*B41M 3/16* (2006.01)

(52) U.S. Cl.
CPC ........... *G09B 21/004* (2013.01); *G09B 21/02* (2013.01); *B41M 3/16* (2013.01)

(58) Field of Classification Search
CPC .... G09B 21/00; G09B 21/001; G09B 21/003; G09B 21/004; G09B 21/02
See application file for complete search history.

(56) References Cited

U.S. PATENT DOCUMENTS

| 4,178,586 A | * | 12/1979 | Schonherr | G09B 21/001 340/407.1 |
| 5,086,287 A | * | 2/1992 | Nutzel | G09B 21/003 340/407.1 |
| 5,449,292 A | * | 9/1995 | Tani | G09B 21/004 434/114 |

(Continued)

OTHER PUBLICATIONS

Search Report and Written Opinion for PCT/US2018/018674; dated Jul. 9, 2018.

(Continued)

*Primary Examiner* — Kurt Fernstrom
(74) *Attorney, Agent, or Firm* — Barnes & Thornburg LLP; Jason Bernstein

(57) ABSTRACT

A refreshable Braille display that connects to computers and serves as a computer monitor for sight impaired people. Integrated within the display are mechanical pins that are activated by either stationary or mobile actuators, such as coils or solenoids. These pins either move rotationally or vertically when activated by the actuators. Spacing of these pins is tight enough to display graphics. Additionally, the pins are arranged such that various heights of the pins enable 3D graphics.

21 Claims, 7 Drawing Sheets

(56) References Cited

U.S. PATENT DOCUMENTS

| | | | |
|---|---|---|---|
| 5,717,432 A | | 2/1998 | Parker |
| 5,766,014 A | * | 6/1998 | Ida .................. G09F 9/37 |
| | | | 434/114 |
| 6,109,922 A | * | 8/2000 | Litschel ............ G09B 21/004 |
| | | | 434/114 |
| 6,734,785 B2 | | 5/2004 | Petersen |
| 6,827,512 B1 | | 12/2004 | Souluer |
| 6,893,263 B2 | * | 5/2005 | Tretiakoff .......... G09B 21/004 |
| | | | 340/407.1 |
| 7,497,687 B2 | * | 3/2009 | Shin .................. G09B 21/004 |
| | | | 434/114 |
| 7,723,896 B2 | | 5/2010 | Esashi et al. |
| 9,524,655 B1 | | 12/2016 | Campos de Leon |
| 10,127,832 B2 | * | 11/2018 | Moon ................ G09B 21/004 |
| 10,424,223 B2 | * | 9/2019 | Lee .................... G09B 21/00 |
| 10,431,119 B2 | * | 10/2019 | Shah .................. G09B 21/004 |
| 2005/0098044 A1 | | 5/2005 | Spedden |
| 2013/0004921 A1 | | 1/2013 | Takahashi et al. |
| 2015/0379895 A1 | * | 12/2015 | Chari .................. G09B 21/004 |
| | | | 434/114 |

OTHER PUBLICATIONS

Preliminary Report on Patentability for PCT/US2018/018674; dated Aug. 27, 2019.

* cited by examiner

REFRESHABLE BRAILLE DISPLAY

PRIORITY CLAIM

This patent application is a U.S. National Phase of International Patent Application No. PCT/US2018/018674, filed 20 Feb. 2018, which claims priority to U.S. Provisional Patent Application No. 62/461,881, filed 22 Feb. 2017, the disclosures of which are incorporated herein by reference in their entireties.

FIELD

The present disclosure relates, in exemplary embodiments, to an apparatus for displaying refreshable Braille (also known as a tactile Braille display) that is generated from an electronic source, such as a computer, tablet, mobile phone or other device that would require refreshable Braille to be displayed.

BACKGROUND

Braille is a language of raised dots read by the finger tips. Louis Braille, a young blind teacher in Paris, created the system in the 1800s whereby alphanumeric characters could be displayed with the sense of touch. The raised dots are created by indentations in paper. Each character is displayed with dots orientated in two vertical columns of three dots each. A sight impaired person then reads by passing fingertips from left to right across a row of characters. Characters can be arranged on a page such that a page of Braille text aligns in a similar fashion to a line of written text that would be displayed to a sighted person.

Braille is displayed in a few different forms currently. Grade I Braille is the current format that is translated letter for letter. Capital letters and other symbols require two characters to be displayed. Grade II Braille is a format that contracts many combinations of letters, such as "tt", and "ough." This allows the reader to have to sense less characters to read, so that faster reading can be attained. Additionally, current format computer braille is often displayed with eight dot Braille, where each character consists of two columns of four dots. This allows for items such as capital letters to be displayed as a single character, instead of two as would be displayed in Grade I Braille.

The Braille dots and how they raise and lower mechanically to create a touchable surface are a critical element of the display. The dots are actuated by placing an actuator under the dot, and with some type of physical force, the dot is raised ("up" position) and or lowered ("down" position).

The current designs of refreshable Braille displays on the market today make use of piezoelectric actuators to raise and lower the braille dots. Each dot of a Braille character requires its own actuator, so an eight dot character of Braille requires eight of these actuators. Piezoelectric actuators work by applying an electric current across a material strip (usually made from ceramic and or metal materials), which then causes the strip to deflect. This deflection causes the dot to raise. However, these piezo actuators are very expensive to manufacture. Therefore, the cost per Braille cell is too high to be used in mass quantity, such as a display containing multiple lines of Braille. Additionally, and more importantly, the piezo electric design does not allow the actuator of each dot to physically reside under each dot. This piezoelectric actuator must be sufficiently long to cause the dot to raise enough for Braille. This length is much longer than what can physically reside under a dot, and therefore limits the current refreshable Braille displays to a single line of text for most applications. Multi-line units are not only too expensive to build, but physically will not allow actuators to fit within the required confines of multi-line displays. This limit to single line displays then forces Braille readers to read one line of text at a time, akin to reading a book on a ticker tape display. This method slows Braille reading down significantly, and results in less access to many methods of print media for the sight impaired.

Therefore, there is a need for a compact Braille cell with refreshable dots and actuators designed to fit generally under the Braille dots and within the confines of the Braille cell.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to the more detailed description below.

Generally described, the present disclosure provides in exemplary embodiments an apparatus for displaying Braille from an electronic input. Braille is the written language for the sight impaired, where combinations of raised and lowered bubbles on pages of paper form the alphanumeric characters of written language. These raised and lowered bubbles, or dots, of the Braille characters are felt by a sight impaired person's fingers as they move along each row, allowing the person to read text translated to Braille.

Refreshable Braille dots are the mechanical pins/bubbles/raised spheres that mechanically raise and lower to create the alphanumeric characters of the Braille. These dots raise up through a surface of a display, so that a fingertip may feel the dot in a raised position. A lowered position is where this dot sinks even or just below the surface so that it can no longer be felt. Since the dots are mechanical, they can be raised, but also be returned to a starting point where they are no longer raised. A typical refreshable Braille character displaying computer Braille takes the form of eight dots (two vertical rows of four dots each). By combining multiple cells together, the characters of a word may be displayed.

In one exemplary embodiment, an apparatus (100) combines the Braille dot that is actuated with the actuator mounted generally under the Braille dot. This combination allows the actuators required for the 8 dots of a Braille cell to be mounted generally within the vertical confines of the Braille cell. These actuators can then display an input to the display from a computer, tablet, or other electronic device via a cable, wireless technology, or other means. Since the braille dots can be individually controlled, the Braille display is refreshable, and can show an image or set of Braille characters, be reset, and then continue to show another image or set of Braille characters.

This combination of actuators and dots in a Braille cell also allows multiple cells to be placed near each other such that words of Braille may be displayed. Additionally, due to the design of the actuators and dots, multiple rows of Braille may also be displayed, allowing a sight impaired person the ability to read multiple rows of characters on one display. The actuator and dot design allows for this compactness that creates the ability to form multiple lines. The whole device will be assembled into a housing that can be portable if battery powered, or semi stationary if a power plug is utilized. The actuator and dot design also allows for the economics of a larger, multi-line display to be possible, where market forces typically did not allow this to happen previously.

Other features will become apparent upon reading the following detailed description of certain exemplary embodiments, when taken in conjunction with the appended claims.

BRIEF DESCRIPTION OF THE DRAWINGS

The drawings disclose exemplary embodiments in which like reference characters designate the same or similar parts throughout the figures of which.

Figure 1A:
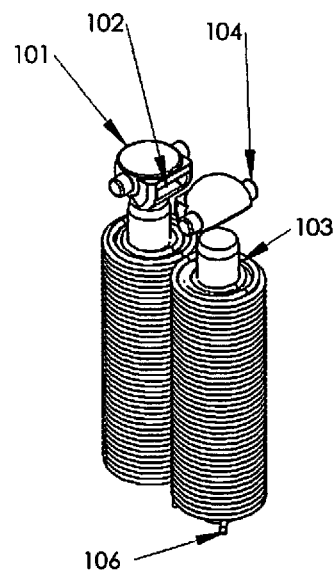
FIG. 1a is a schematic perspective view of one exemplary embodiment of a Braille dot design.

In describing the exemplary embodiments of the invention, which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word connected or terms similar thereto are often used. They are not limited to direct connection but include connection through other elements where such connection is recognized as being equivalent by those skilled in the art.

DETAILED DESCRIPTION

Unless otherwise indicated, the drawings are intended to be read (for example, cross-hatching, arrangement of parts, proportion, degree, or the like) together with the specification, and are to be considered a portion of the entire written description of this invention. As used in the following description, the terms "horizontal", "vertical", "left", "right", "up" and "down", "upper" and "lower" as well as adjectival and adverbial derivatives thereof (for example, "horizontally", "upwardly", or the like), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

A basic principle of the presently disclosed embodiments involves the use of compact and economical components for each of the mechanical elements that form the "Braille dots", or also referred to as "dots", and the actuators for each of the individual Braille dots in a Braille cell. The compactness of the design allows for the creation of a multi-line display, or even a graphics display. Actuators for the Braille dots can be fixed, or can be moving. Moving actuators under the Braille dots can actuate more than one Braille dot at a time, which can allow for very large displays with many Braille dots, including those that can show large graphics.

Figure 1B:
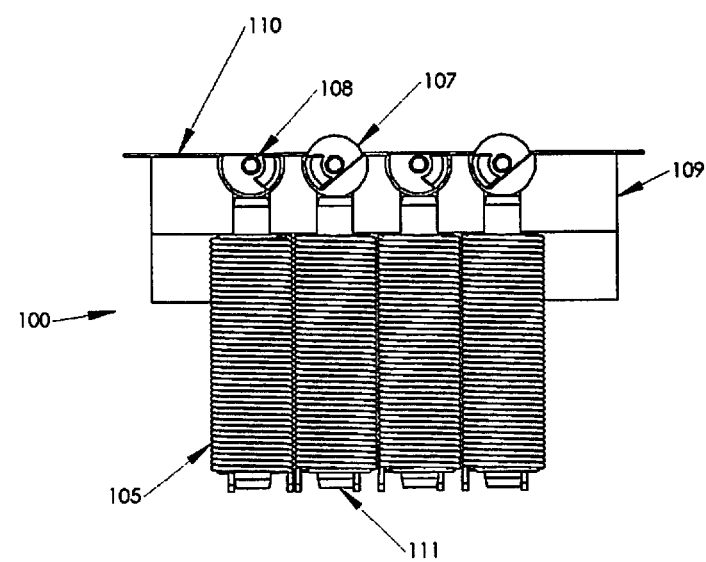
FIG. 1b is a front elevational view of one exemplary embodiment of a Braille dot design.

There are several different approaches to the mechanical elements that form the Braille dots. In FIG. 1a and FIG. 1b, one exemplary embodiment is shown that has a Braille dot that is essentially a half sphere, or a hemisphere (101), and this is referred to as the "flip-dot" design. The edge of the flip-dot will have a magnet (102) attached to it, which fits into a slot in the flip-dot. Alternatively to a magnet, the entire flip-dot could be made from magnetic material. When a coil (103) is placed under the flip-dot and energized with electricity via its connections (106), the coil will create a magnetic field in the metal core (111) which will cause a magnetic repulsion to the flip-dot, which then causes the flip-dot to rotate about a fixed axis (104) that is integral to the flip-dot. (The axis can be part of the flip-dot, or also can be an element that is assembled later. Alternatively, this axis also could be created by a hole within the flip-dot, and the axis would be external.) The flip-dot, when actuated, will rotate about 180 degrees, so that the hemisphere is now oriented in an upward position. (It is possible that the flip-dot can rotate less than 180 degrees, or more than 180 degrees and work just as well.) This will then create the raised flip-dot (107) through a surface (110) that will be part of a Braille cell, and can be felt/read by a person. When the flip-dot needs to be retracted, the coil will then have the electricity reversed, which will then create a magnetic field that will cause the flip-dot to rotate in the opposite direction, or simply retract the flip-dot to a lowered position (108). A housing (109) surrounds the flip-dots and supports this structure. The actuators will be assembled to the housing, or connected to another piece which would then connect to the housing.

Figure 1C:
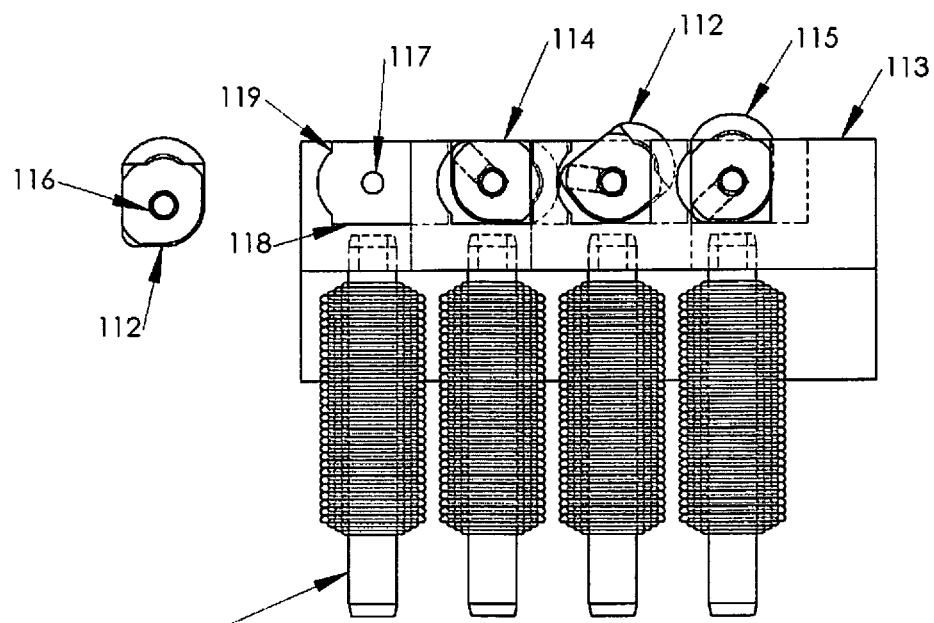
FIG. 1c is a front elevational view of one exemplary embodiment of a Braille dot design.

In one alternative exemplary embodiment, as shown in FIG. 1c, the flip-dot (112) will rotate generally about 90 degrees around an axis (116). The axis will be part of the flip-dot, or a mechanical element that is assembled later. This axis also could be created by a hole within the flip-dot, and the axis would be external. This flip-dot will be mounted in a bushing or housing (113) that restricts the motion of the flip-dot from a retracted position (114) to an extended position (115). The transitional position when moving can be seen by item (112). The flip-dot pivots about a bearing surface (117) that is either integral to the housing, or external through a hole in the flip-dot. Stops (118 and 119) will restrict the motion of the flip-dot, stopping rotation in either a raised position or a lowered position. These stops will be integral into the housing, or separate elements that could be assembled later. The rotation of the flip-dot is caused by supplying an electric current to the actuator (105), which will cause a repulsive force or an attractive force within the magnet inside of the flip-dot, or a magnet attached somewhere to the flip-dot. Alternatively, the flip-dot may be made from magnetic material that is polarized such that the actuator may affect the rotational motion.

Figure 1D:
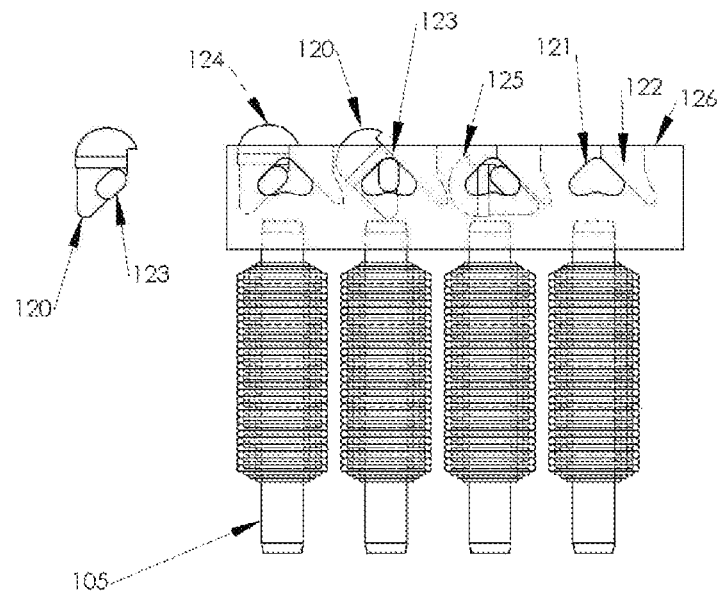
FIG. 1d is a front elevational view of one exemplary embodiment of a Braille dot design.

In another alternative exemplary embodiment, as shown in FIG. 1*d*, the flip-dot (120) will rotate generally about a shaft (123) that does not have a fixed axis. In this case, the flip-dot will go through a series of motions while rotating. The actuator (105), when an electrical current is applied to it, will cause the flip-dot to first lift upward toward the surface and away from the actuator. Again, the magnetic force from the actuator will attract or repel a magnet that is inside of the flip-dot, or attached to the flip-dot. (Alternatively, the flip-dot may be made from magnetic material that is polarized such that the actuator may affect the motion.) Then, once raised, the flip-dot will rotate in the slot (121). After the rotation, the flip-dot will then return to either a lowered position (125) or a raised position (124). By reversing the electrical current in the actuator, the position of the flip-dot is reversed. Once the flip-dot rotates, it will be stopped by a mechanical stop (122) that is either integral into the housing (126) or a separate piece that is connected to the housing. The slot (121) will be part of the housing, or will be connected to the housing. One of the primary benefits of this embodiment is that since the flip-dot goes through a series of motions that is not along a fixed axis, the flip-dot will be locked into place. This lock is formed by the flip-dot being prevented from moving in a simple rotational axis due to the motion required to change position. The lock will prevent the flip-dot from rotating to a different position during reading by the fingertips.

Figure 1E:
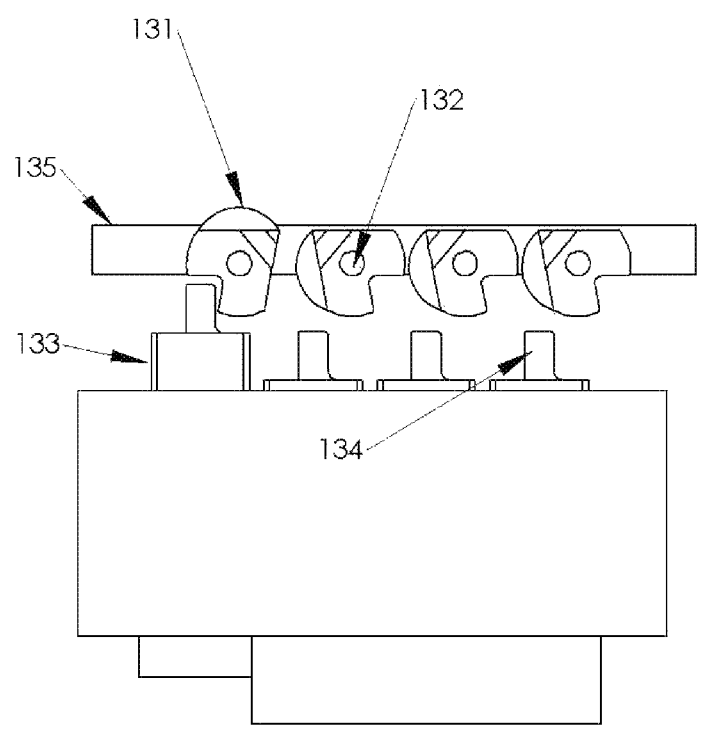
FIG. 1e is a front elevational view of one exemplary embodiment of a Braille dot design.

In an alternative exemplary embodiment, the flip-dot will be actuated with a mechanical motion, such as solenoids, or air flow and pressure controlled through a pneumatic valve. If a solenoid is used, then the flip-dot will be flipped mechanically by the solenoid plunger, and retracted by the same means, as can be seen in FIG. 1*e*. In this exemplary embodiment, the flip-dot (131) is rotated mechanically when an actuator (133) under the flip-dots is raised and moved past the flip-dot, causing them to rotate about an axis (132) and flip over to a raised position. Actuators that remain in a lowered position (134) do not cause the flip-dots to flip over. The flip-dots are then retracted to a down position by retracting the actuators, traveling in a reverse direction to cause the flip-dots to flip to a lowered position.

These flip-dots (101, 107, 112, 120, & 131), regardless of design, can be locked into place in some form once they are raised to prevent them from retracting when a person's fingers touch the flip-dots to feel them. While it is possible that the design will work without a locking system, some locking form will be better to hold the flip-dots in place. In one exemplary flip-dot design, this lock will simply be gravity, as the flip-dot is flipped over center and gravity will pull it down. This will require the axis of the rotation of the flip-dot to be made in such a way to allow gravity to take over and hold the flip-dot in place. The flip-dot will also be held in place by an external magnet used to attract the hemisphere to a surface, or the magnet within the hemisphere attracting to a surface. Alternatively, the residual magnetism in the core of a coil could be used to hold the flip-dot in position. If more magnetic strength is needed to lock the flip-dot in place, then the coil will remain energized, but at a much lower power than the power needed to actuate the flip-dot, to create a magnetic field that will hold the flip-dot in place. Alternatively, a spring will extend into place, either via a coil spring or a straight spring. This spring will then be retracted (or relieved of pressure) via another actuator or the same actuator that actuated the flip-dot originally, at which time the flip-dot will be returned to its "down" position. Alternatively, in FIG. 1*d*, the motion of the flip will lock the flip-dot (120) into place.

Figure 2A:
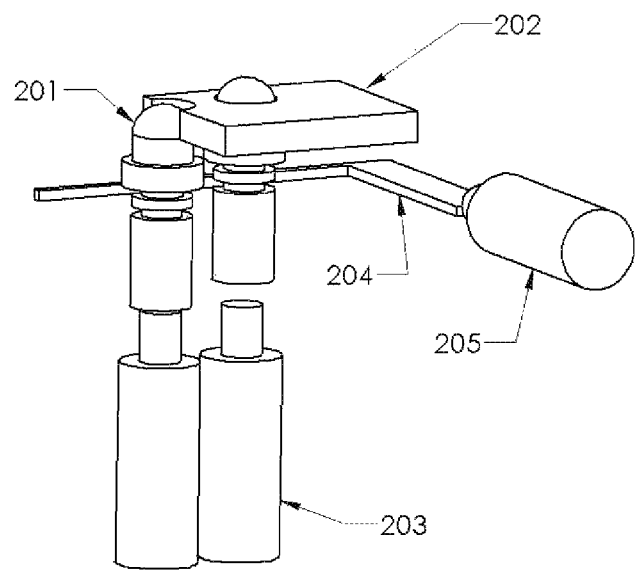
FIG. 2a is a schematic perspective view of one exemplary embodiment of a Braille dot.
Figure 2B:
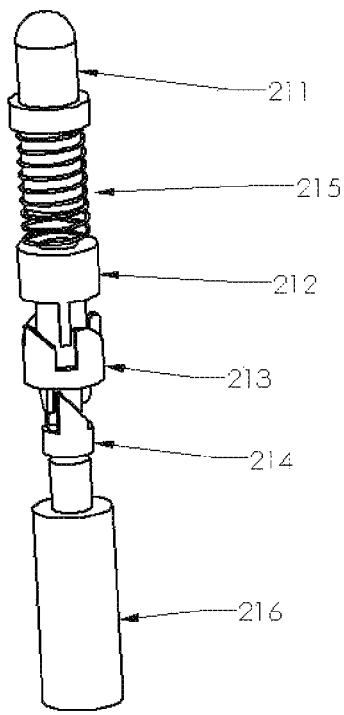
FIG. 2b is a schematic perspective view of one exemplary embodiment of a Braille dot.
Figure 2C:
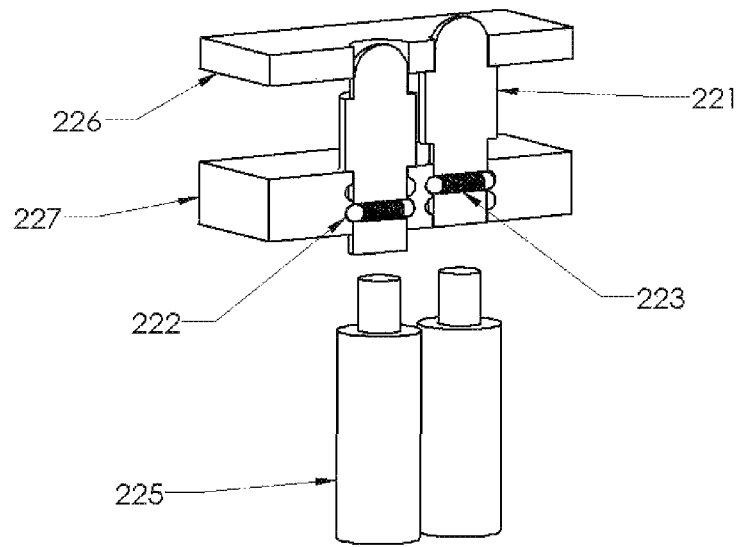
FIG. 2c is a schematic perspective view of one exemplary embodiment of a Braille dot.

An alternative embodiment to a flip-dot design is a vertical pin design, as in FIG. 2*a*, FIG. 2*b*, and FIG. 2*c*. These vertical pins will require a latching system to hold them in position due to the unidirectional and vertical nature of their movement. This latching system will be a mechanical spring (though any variety of latching mechanisms can be envisioned to be used). The spring will take on various forms. The vertical pin (201), which will be raised and lowered to form the dots of Braille through the surface (202), will have grooves in it (FIG. 2*a*) with which a spring (204) will snap into various positions. The vertical pins will be raised by actuators (203), and then held in place by the springs (204). The springs will be moved out of the way or moved in such a way as to retract the vertical pin by another actuator (205). A third actuator will be employed to cause the vertical pins to retract as well.

The vertical pin (211) also will move vertically in a form of rotation, similar to the operation of a ball point pen, with a mechanical spring (215), an actuator (216), and rotation that occurs when the vertical pin is raised or lowered (FIG. 2*b*). The elements of the vertical pin (212), (213), and (214) are similar to what may be found in a click writing pen, and the elements form the rotary motion to lock the vertical pin in either a raised or lowered position.

The vertical pin (221) will also be held in place by a ball (222) and spring (223) mechanism (FIG. 2*c*). This is something similar to what is found on a hydraulic valve (referred to in the industry as a detent), used to hold the hydraulic valve in position during operation, or what might be found in a common spring pin with release. The vertical pin will be sandwiched between two plates (227 & 226). The vertical pin will be raised by a separate actuator (225) under the vertical pin, while the top plate (226) will be used to lower the vertical pin. Some other actuation could also lower the vertical pin as well, such as solenoids.

To explain this vertical pin design another way, in exemplary embodiments, the vertical pin design will either include a latching system internal to the vertical pin (FIG. 2*c*), or external to the vertical pin (FIG. 2*a*), or use a latching system that is a combination of both external and internal to the vertical pin (FIG. 2*b*). The spring latching system will take many forms. However, frictional wear will be important elements of this style of vertical pin as the vertical pin slides vertically while being positioned.

In another exemplary embodiment of the Braille dots, (shown in FIG. 3*a*, FIG. 3*b*, and FIG. 3*c*) each Braille dot has multiple vertical positions. Essentially, the Braille dot is raised to multiple different heights and locked into place. While this adds some complexity to the design, this creates the opportunity for a three dimensional tactile display. These Braille dots will then be locked into place, similar to a two dimensional display, to prevent them from retracting when a person's fingers touch the Braille dots to feel them. This different height positions will create a three dimensional effect that can be sensed by the fingers.

Figure 3A:
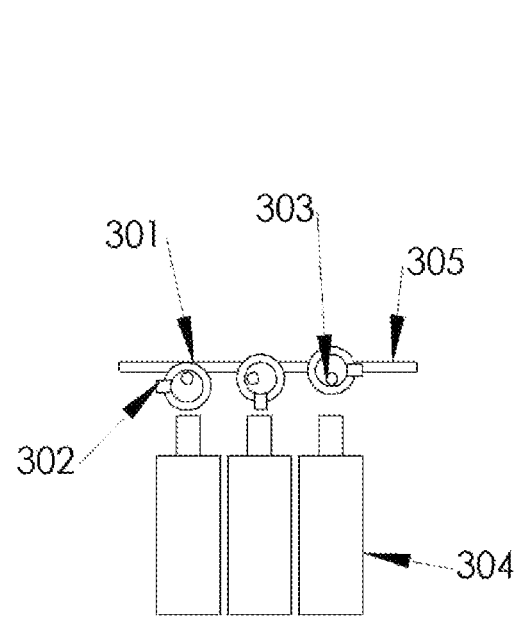
FIG. 3a is a front elevational view of one exemplary embodiment of a three dimensional Braille dot design.

A first such Braille dot design is shown in FIG. 3*a*. This Braille dot is created by using a variation of the previous flip-dot design. In this design, the flip-dot design utilizes a cylinder or sphere design (301), and the flip-dot will be designed such that the axis (303) the flip-dot spins on is not central through the sphere/cylinder. The flip-dot also could take the shape of a full sphere at this point, as well. This off-center axis will allow the flip-dot to rotate in a manner that allows the flip-dot to raise more as the sphere spins more. In other words, the larger the rotation of the flip-dot, the larger the raise of the flip-dot, until the flip-dot reaches a maximum height above the surface of the cell. Like the two dimensional design, the flip-dot is spun by an actuator (304) under the flip-dot that pushes against a magnet (302) which is integral to the flip-dot. (The magnet could also be attached to the flip-dot, or the flip-dot itself could be made from magnetic material and polarized.) This flip-dot will then be retracted by the same actuator that caused the initial action, but by reversing electrical current.

Figure 3B:
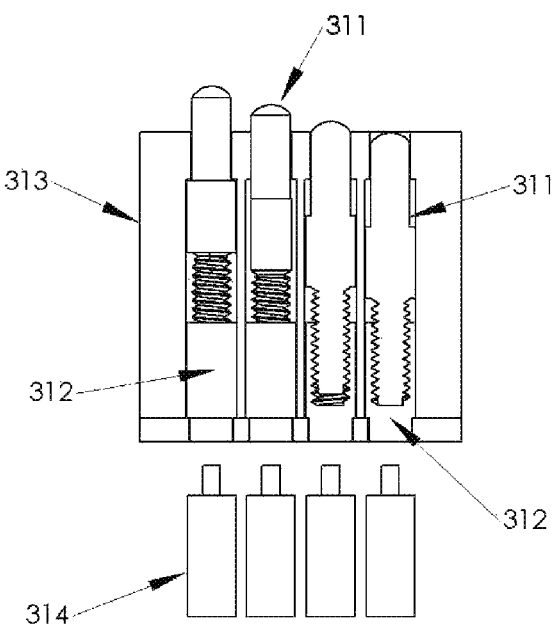
FIG. 3b is a front elevational view of one exemplary embodiment of a three dimensional Braille dot design.

Another exemplary method of this height difference is shown in FIG. 3b and is accomplished by a lead screw (311) that is adjusted by an actuator below (314). With this arrangement, the more that the screw spins, the higher that the vertical pin will be raised (or lowered). When combined together with a group of other vertical pins, this leadscrew design will create a three dimensional tactile display.

The lead screw will be coupled to the actuator via a friction coupling or a magnetic coupling. Any coupling that results in a mechanical engagement of the actuator to the lead screw can be used. The lead screw can also be turned by a nut (312). The nut is captured vertically, and the nut is coupled to the actuator. The captured nut will turn and force a leadscrew that was either integral to the vertical pin, or attached to a vertical pin, upwards or downwards based on the direction of the actuator. An alternative to this design is to fix the nut (312), keep it from rotating. The lead screw will be coupled to an actuator, which will then be connected or directly part of the vertical pin. The lead screw can also be orientated in any direction, and possibly even at a right angle if bevel gears were used, though gearing will add substantial complexity and cost to the design.

To alternatively state the above, an actuator will be connected to a leadscrew or a nut for a leadscrew. The actuator's turning action will cause the lead screw to raise and lower the vertical pin. Frictional forces will keep the vertical pin in a raised position, though a frictional lock will also be applied after the actuator activates to prevent any slippage and change of height due to sensing the vertical pin with a finger. It is also intended that a magnetic lock or a mechanical lock can also be used to hold the vertical pin in a raised position.

Figure 3C:
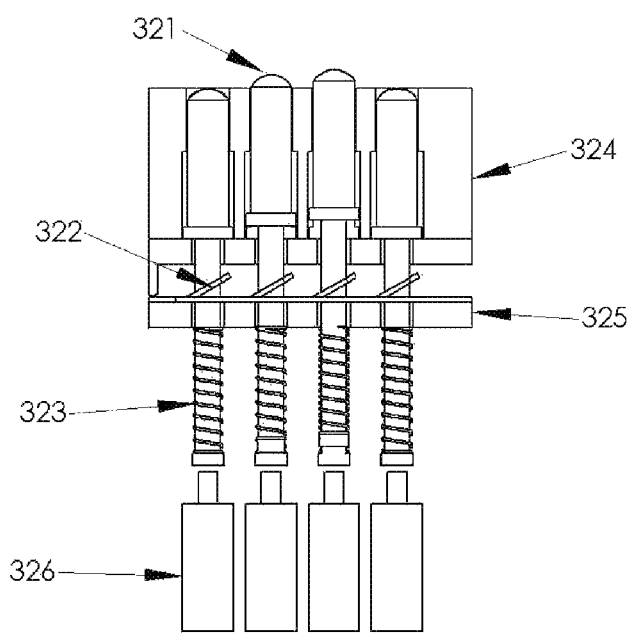
FIG. 3c is a front elevational view of one exemplary embodiment of a three dimensional Braille dot design.

A third alternative exemplary embodiment of a variable height vertical pin, as shown in FIG. 3c, utilizes a vertical pin (321) having multiple stopping points with a spring lock (322), similar to the method which is commonly used on a bar clamp. The spring lock feature allows for infinite positioning, and therefore will easily create the various height positions. A spring (323) will keep pressure against the spring lock to hold the vertical pin in place. An actuator (326) will push the vertical pin to various heights. This various height positions for the vertical pin will create the three dimensional display. These vertical pins will then be retracted by releasing all of the spring locks at the same time and using either gravity or an actuator linked via an arm (325) to the spring locks to pull all of the vertical pins back to their starting position. Alternatively, an actuator that uses magnetism will be used to position the vertical pins.

While the multiple stop designs described hereinabove can create a three dimensional display, they may come with an increased complexity and cost over the simple up or down placement of the Braille dots. Therefore, the design for a three dimensional display may cost more to build than a two dimensional display.

One aspect of the currently disclosed Braille cell design is that the actuation of the Braille dot has been split apart from the Braille dot itself and its locking mechanism. An actuator positions a Braille dot to a raised or lowered position. That does not mean that the actuator cannot be connected to the Braille dot via a mechanical connection, which can easily be done. However, the separation gives the design flexibility to move the actuator, and reduce the complexity of the device by doing so.

Figure 4:
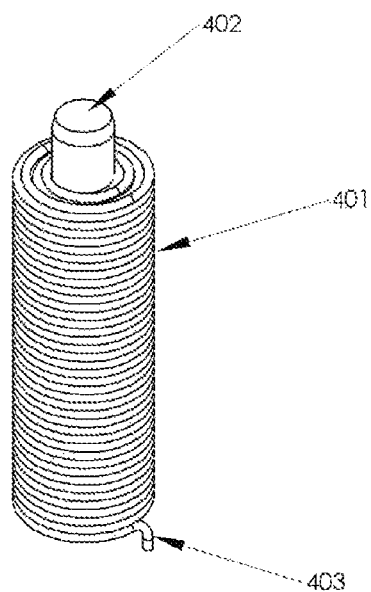
FIG. 4 is a schematic perspective view of an actuator design.

Actuating the Braille dots is accomplished by a variety of different means. In one exemplary method, as shown in FIG. 1a, the flip-dot will be actuated by a magnetic actuator, such as a coil (401) wrapped around a metal core (402) and selectively energized through connections (403) as shown in FIG. 4. This coil will be connected to a circuit board via standard electronic connection methods, and which will then be getting its input from a computer or similar output device. This computer or output device will be connected to the display via a cable connection, or will be integral into the display, such as a common tablet computer.

Figure 5A:
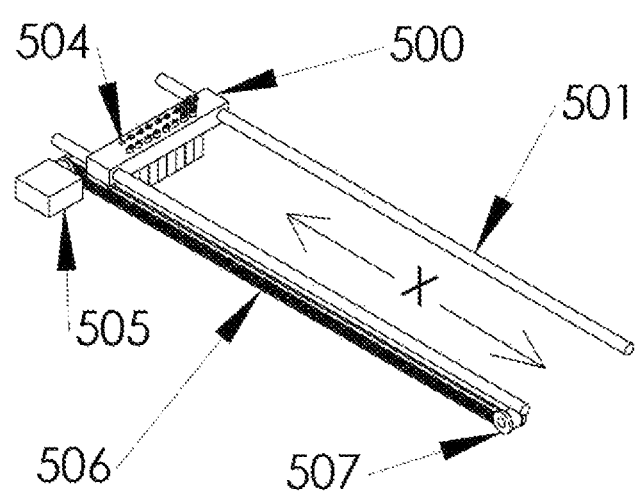
FIG. 5a is a schematic perspective view of one exemplary embodiment of a gantry motion system for actuators.

Other exemplary mechanisms for actuation include standard solenoid coils or any type of electric motor. These actuators are designed to fit the envelope of space under an individual Braille dot for fixed actuator displays, or will be larger in the case of mobile actuator displays (FIG. 5a, FIG. 5, and FIG. 5c). If they are larger and mobile, the actuators have the ability to be mounted inline under the Braille dot, or mounted at some angle relative to the Braille dot to allow more actuators in a relatively smaller space.

Figure 5B:
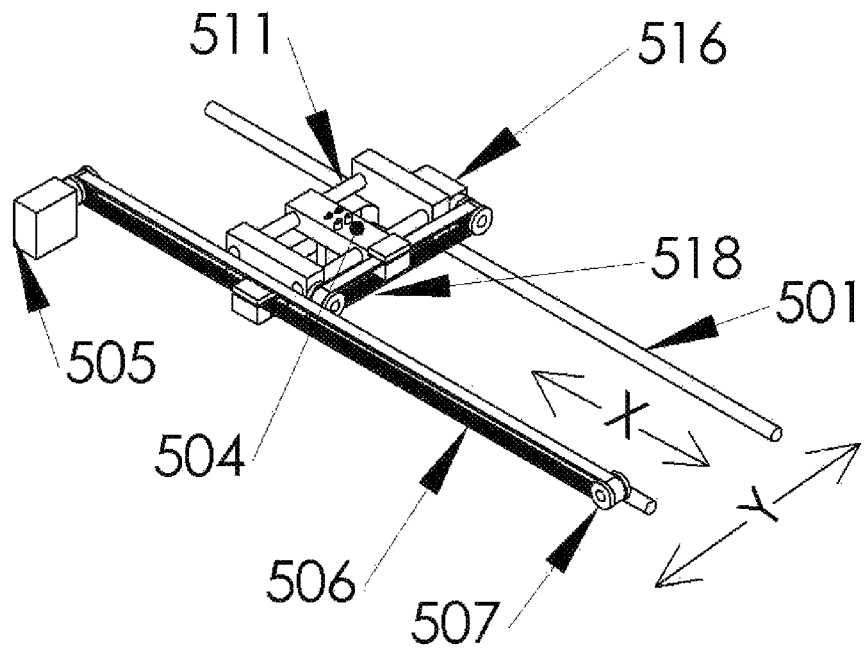
FIG. 5b is a schematic perspective view of one exemplary embodiment of a gantry motion system for actuators.
Figure 5C:
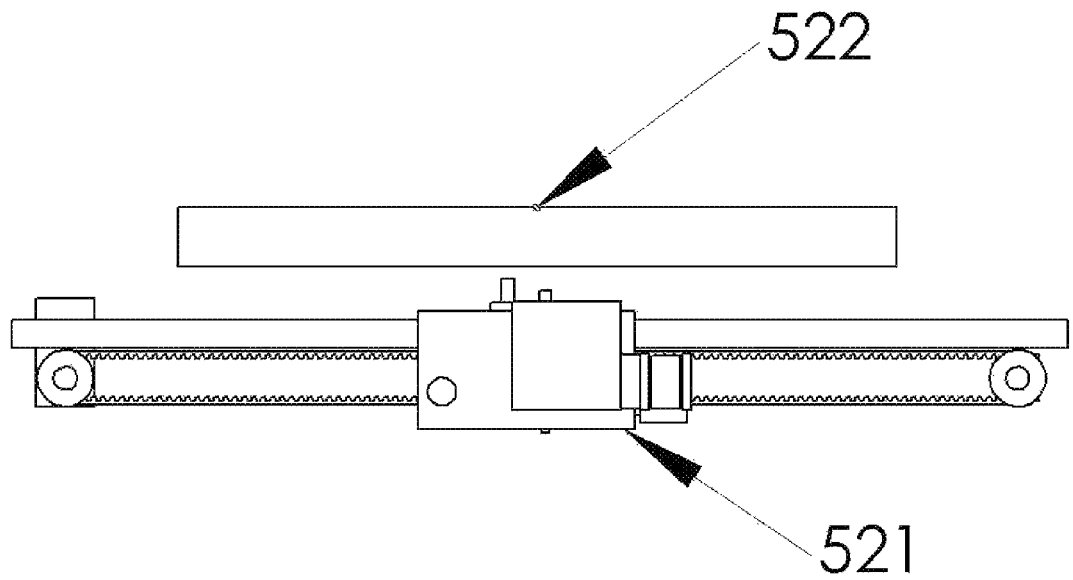
FIG. 5c is a front elevational view of one exemplary embodiment of a gantry motion system for actuators moving under a display of braille dots.

The actuators will be either fixed in position under the Braille dots, as shown in FIG. 1b, or movable, as in FIG. 5a, FIG. 5b, and FIG. 5c. When the actuators are movable, they will be positioned under the Braille dots via a gantry system, which will have either an X or a Y motion direction relative to the surface of the display, or will move in both directions. In FIG. 5a, the gantry (500) is moved in the X direction by a motor (505) which drives a belt (506) around a pair of pulleys (507). The actuators (504) are mounted to the gantry and move along as the gantry moves up and down the rails (501). In FIG. 5b, an additional motor (518) drives the gantry (516) in a Y direction on a 2nd set of rails (511). It is also possible that motion will be in a variety of different directions, though the X and Y directions appear to be the most efficient. In FIG. 5c, the gantry system (521) moves underneath and separate from the Braille dots mounted in a display (522). Since the actuators are the most complex part of the system, making them mobile greatly reduces the complexity of the system.

Figure 6:
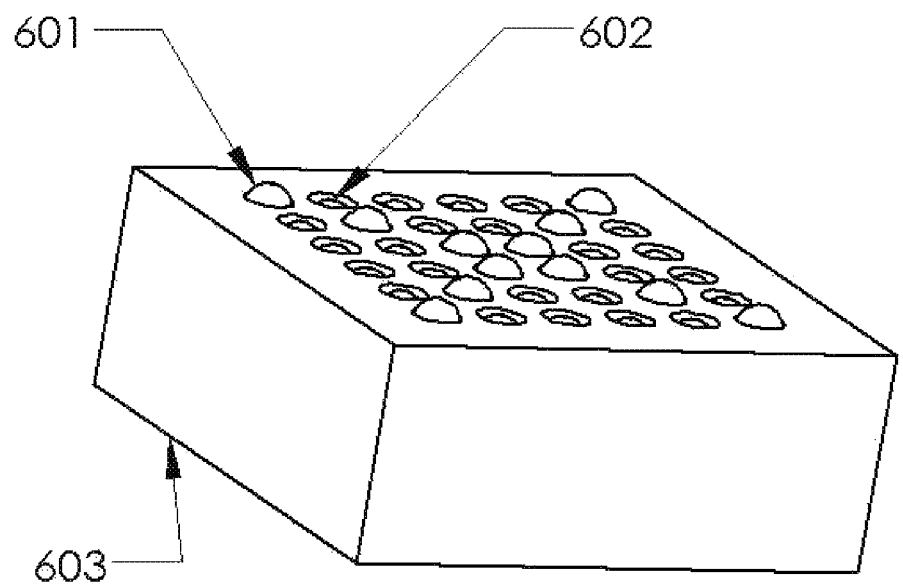
FIG. 6 is a schematic perspective view of one exemplary embodiment of a graphics display.

One advantage of having movable coils and or solenoids, in addition to potentially reducing the cost of the entire display, will be that the Braille dots will be spaced much tighter than typically is done with Braille displays. If the Braille dots will be spaced tighter, such as shown in FIG. 6, the ability to create not only Braille characters, but also graphics that can be sensed by the fingertips are created. This will essentially create a two dimensional tactile display. The raised Braille dots (601) may create the basic points for simple graphics. Lowered Braille dots (602) may be similar to an off position for graphics, while raised Braille dots (601) may be on. These graphics can include everything from bar and line graphs in mathematics to maps and drawings. This graphic display is something that does not currently exist for people with impaired vision, and does create the potential for new ways of learning and interacting with not only computers, but also the world in general.

Figure 7:
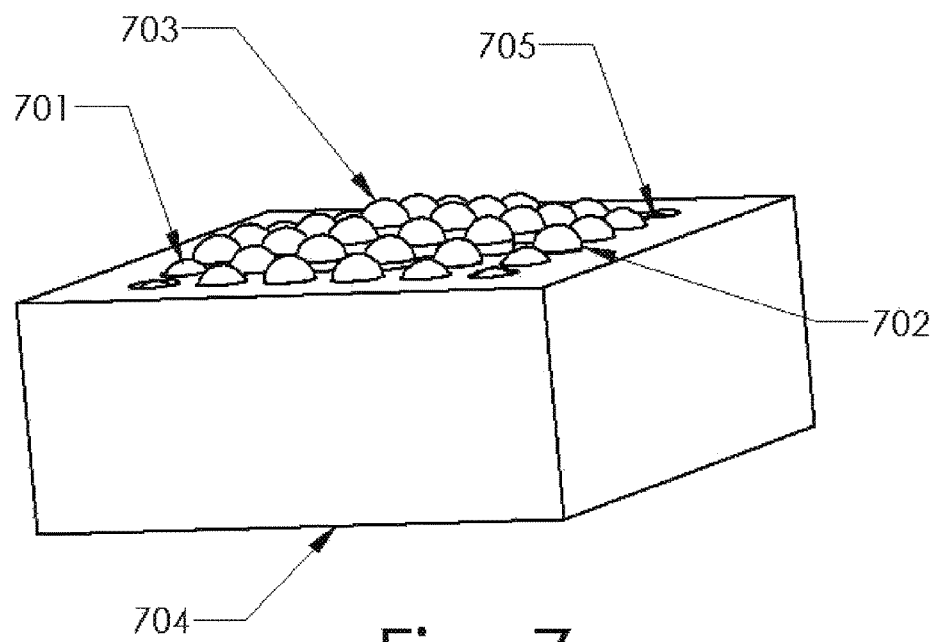
FIG. 7 is a schematic perspective view of one exemplary embodiment of a three dimensional graphics display.

In consideration of more developed graphics, the use variable position Braille dots will effectively create a three dimensional tactile display (FIG. 7). The height of the individual dots (701, 702, 703 & 705) will be determined by the actuators. In one embodiment, the height will be determined by the length of time that the actuator is engaged to the Braille dot. The amount raised in relation to the surface of the display (704) will create the graphical display. These same actuators will then be used to retract the Braille dots, or a separate actuator will retract all of the Braille dots of the display. Similar to the two dimensional display, the Braille dots will be arranged tightly so that graphics will be displayed. These graphics, though, by having a third dimension in terms of height, add a new element of interaction with computers or similar electronic devices for sight impaired people.

Figure 8:
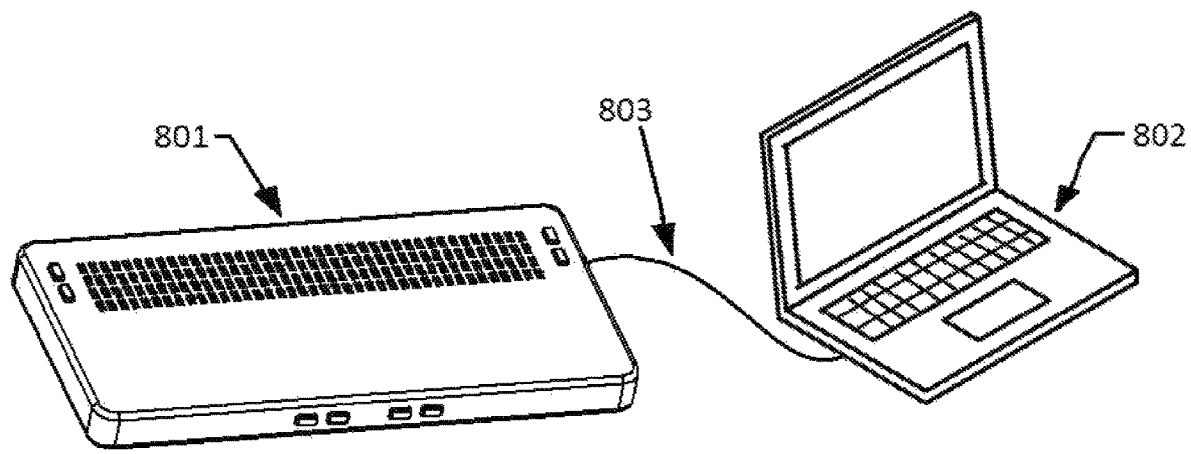
FIG. 8 is a schematic perspective view of one exemplary embodiment of a method of displaying graphics, including the alphanumeric characters of Braille.

The present disclosure also provides a method of displaying Braille. In one exemplary embodiment, as shown in FIG. 8, a method of displaying Braille comprises first providing an apparatus comprising a grid of housings (801). Each housing is made up of one or more parts, and contain one or more flip-dots and one or more actuators that are arranged to coordinate motions of the flip-dots. The grid is formed by aligning housings in a format such that an unlimited number of housings may be aligned together laterally and or longitudinally. The resulting grid of cells will display graphics, including those of the alphanumeric characters used in Braille, and several rows of the housings longitudinally will display several rows of graphics. In one step, an input signal via a wired connection (803), Bluetooth wireless connection, or any other standard connection between electronic devices, is sent from a processor (802). This processor (802) can be a computer, a cellphone, or any other conceivable output device that may need to display graphics or Braille to a sight impaired person. In another step, the output signal is controlled by an input from the sight impaired person interacting with the processor. In a next step, the output signal displayed on the grid of housings is then read by the sight impaired person through the use of the person's fingertips sensing the raised and lowered flip-dots, this sensing being referred to as reading the graphics. Once the flip-dots have been read, the grid of housings may then be refreshed as a result of an interaction of a person with the processor, whereby the flip-dots are all returned to a lowered position and ready to display the next input signal from the processor.

In another exemplary embodiment, as shown in FIG. 8, a method of displaying Braille comprises first providing an apparatus comprising a grid of housings (801). Each housing is made up of one or more parts, and contain one or more vertical pins and one or more actuators that are arranged to coordinate motions of the vertical. The grid is formed by aligning housings in a format such that an unlimited number of housings may be aligned together laterally and or longitudinally. The resulting grid of cells will display graphics, including those of the alphanumeric characters used in Braille, and several rows of the housings longitudinally will display several rows of graphics. The graphics are displayed as a result of an input signal sent from a processor (802) via a wired connection (803), Bluetooth wireless connection, or any other standard connection between electronic devices. This processor could be a computer, a cellphone, or any other conceivable output device that may need to display graphics or Braille to a sight impaired person. This output signal is controlled in some way by a person interacting with the processor. The output signal displayed on the grid of housings is then read by the sight impaired person through the use of the person's fingertips sensing the raised and lowered vertical pins, this sensing is being referred to as reading the graphics. Once the vertical pins have been read, then the grid of housings may be refreshed as a result of an interaction of the sight impaired person with the processor, wherein the vertical pins are all returned to a lowered position and ready to display the next input signal from the processor.

Embodiments of the presently disclosed apparatus have economic benefits compared to current designs on the market today. The embodiments may cost substantially less than previous designs incorporating piezoelectric actuators due to the design of the actuator and the Braille dots. Coils are far less expensive to manufacture than piezoelectric actuators. This lower cost per cell makes multi-line displays possible at lower market costs than are currently offered. When considering the embodiment of the design that makes use of mobile actuators, this cost reduction per Braille dot is magnified because the cost of each Braille dot will not require an individual actuator. This mobile actuator cost reduction allows for the potential of much larger displays at potentially even lower costs. Additionally and more importantly, the mobile actuators remove the number of parts in the display. Since there are 8 Braille dots per cell, and typically 40 cells per line of text, this number of components can be very large for multi-line displays. So, the reduction in parts is significant in terms of the life of the machine, and the potential for failure of parts.

There are some alternative applications for this invention. These include the potential to display topographical maps for the benefit of geologists and surveyors. Maps in general could also be displayed in a graphical display, for the benefit of both sight impaired as well as sighted people as a way to present information in a new format. For medical purposes, a three dimensional display could allow doctors to visualize results of tests. This could give doctors another method of understanding of a medical condition that may not be possible with a computer monitor. While these represent a few of the potential alternative applications, it is believed that there are far more applications that could evolve from this invention.

The following numbered clauses include embodiments that are contemplated and non-limiting:

Clause 1: An apparatus for creating tactile shapes, comprising of a mechanical element that moves between a lowered and raised position; an actuator moving the mechanical element from a lowered to a raised position and back again; a housing for one or more actuators and one or more mechanical elements, the housing being comprised of one or several parts that allow the actuators and mechanical elements to coordinate motions; the actuator being mounted substantially underneath of the mechanical element and below the surface of the housing, such that a plurality of the actuators and elements are situated in a repetitive pattern in the housing; an upper element of the housing forming the horizontal surface plane of the apparatus, such that the mechanical element raises above the horizontal surface in a raised position to create a tactile shape, and retracts generally below the plane of the surface when in a lowered position and, wherein a plurality of housings may be packed together into a tactile display with no limitation in terms laterally or longitudinally along the horizontal surface plane.

Clause 2: The apparatus of clause 1, wherein the mechanical element is raised in response to a rotational motion about an axis within the mechanical element, such that the mechanical element is raised either through or at least partially above the surface of the housing to create a tactile shape, wherein such raising is affected by an actuator associated with the mechanical element.

Clause 3: The apparatus of clause 2, wherein the mechanical elements are arranged in patterns to display graphics, including those of the alphanumeric characters of Braille.

Clause 4: The apparatus of clause 2, wherein the mechanical element's motion is caused by an actuator with an electrical current running through the actuator which either causes a magnetic field or adapts a motion of a mechanical element.

Clause 5: The apparatus of clause 2, where the mechanical elements are locked into either the raised or lowered position.

Clause 6: The apparatus of clause 2, where in the mechanical element will be raised to more than one height above the surface of the housing, such that a tactile difference in height of the mechanical elements is created.

Clause 7: The apparatus of clause 2, wherein the rotational motion of the mechanical element does not occur about a fixed axis, but instead, the axis may move in relation to the rotation during the rotation.

Clause 8: The apparatus of clause 7, wherein the motion affected by an actuator of the mechanical element results in a lock of the mechanical element after completing its motion.

Clause 9: The apparatus of clause 1, wherein the mechanical element will be raised due to a vertical motion of the mechanical element in relation to the horizontal surface plane such that it creates a tactile shape, its motion adapted by an actuator below the mechanical element;

Clause 10: The apparatus of clause 9, wherein the housing contains more than one actuator and more than one mechanical elements that are arranged in patterns to display graphics, including those of the alphanumeric characters of Braille.

Clause 11: The apparatus of clause 9, wherein the mechanical element's motion is caused by an actuator with an electrical current running through the actuator which either causes a magnetic field or adapts a motion of a mechanical element.

Clause 12: The apparatus of clause 9, where the mechanical elements are locked into either the raised or lowered position, either caused by the motion of the mechanical element, or locked by an external force to the element.

Clause 13: The apparatus of clause 9, where in the mechanical element will be raised to more than one height above the surface of the housing, such that a tactile difference in height of the elements is created.

Clause 14: An apparatus for creating tactile shapes, comprising a mechanical element that moves between a lowered and raised position; an actuator adapted to reciprocatingly move the mechanical element from a lowered to a raised position and back again; a first housing for the actuator that contains one or more actuators; a second housing that contains one or more mechanical elements; the first and second housings comprising one or several parts that allow the actuator and mechanical element to coordinate motions; the actuator being mounted substantially underneath of the mechanical element and below the surface of the housing, such that many of these actuators and elements may be situated in a repetitive pattern in the first and second housings; the upper element of the second housing forming the horizontal surface plane of the apparatus, such that the mechanical element raises above the horizontal surface in a raised position to create a tactile shape, and retracts at least partially below the plane of the surface when in a lowered position; the design of the first and second housings is such that many housings may be packed together into a tactile display with no limitation in terms laterally or longitudinally along the horizontal surface plane.

Clause 15: The apparatus of clause 14, where in the first housing moves under the second housing, such that an actuator mounted in the first housing may be used to adapt the motion of more than one mechanical element in the second housing.

Clause 16: The apparatus of clause 15, wherein the mechanical elements are arranged in graphical patterns that can display the alphanumeric characters of Braille.

Clause 17: The apparatus of clause 15, wherein the mechanical element's motion is caused by an actuator with an electrical current running through the actuator which either causes a magnetic field or affects a motion of a mechanical element.

Clause 18: The apparatus of clause 15, wherein the mechanical element is raised in response to a rotational motion about an axis within the mechanical element, such that the mechanical element is raised either through or at least partially above the surface of the housing to create a tactile shape, wherein such raising is affected by an actuator associated with the mechanical element.

Clause 19: The apparatus of clause 18, where the mechanical elements are locked into either the raised or lowered position, either caused by the motion of the mechanical element, or locked by an external force to the element.

Clause 20: The apparatus of clause 19, where in the mechanical element will be raised to more than one height above the surface of the housing, such that a tactile difference in height of the elements is created.

Clause 21: The apparatus of clause 19, wherein the rotational motion of the mechanical element does not occur about a fixed axis, but instead, the axis may move in relation to the rotation during the rotation.

Clause 22: The apparatus of clause 21, wherein the motion affected by an actuator of the mechanical element results in a lock of the mechanical element after completing its motion Clause 23: The apparatus of clause 15, wherein the mechanical element will be raised due to a vertical motion of the mechanical element in relation to the horizontal surface plane. This motion raises the mechanical element through or above the surface of the housing to create a tactile shape. This motion is affected by an actuator mounted underneath the mechanical element.

Clause 24: The apparatus of clause 23, where in the mechanical element is raised to more than one height above the surface of the housing, such that a tactile difference in height of the elements is created.

Clause 25: A method for reading Braille comprising: providing an apparatus comprising a mechanical element that moves between a lowered and raised position; an actuator moving the mechanical element from a lowered to a raised position and back again; a housing for one or more actuators and one or more mechanical elements, the housing being comprised of one or several parts that allow the actuators and mechanical elements to coordinate motions; the actuator being mounted substantially underneath of the mechanical element and below the surface of the housing, such that a plurality of the actuators and elements are situated in a repetitive pattern in the housing; an upper element of the housing forming the horizontal surface plane of the apparatus, such that the mechanical element raises above the horizontal surface in a raised position to create a tactile shape, and retracts generally below the plane of the surface when in a lowered position and; wherein a plurality of housings may be packed together into a tactile display with no limitation in terms laterally or longitudinally along the horizontal surface plane; wherein the mechanical element is rotated about an axis within the mechanical element, such that the mechanical element is raised either through or at least partially above the surface of the housing to create a tactile shape, wherein such raising is adapted by an actuator associated with the mechanical element; and a processor that sends a user defined input signal to the apparatus to display on the apparatus, such that the user may sense the signal output on the apparatus.

Clause 26: A method for reading tactile graphics, comprising: providing an apparatus comprising; a mechanical element that moves between a lowered and raised position; an actuator moving the mechanical element from a lowered to a raised position and back again; a housing for one or more actuators and one or more mechanical elements, the housing being comprised of one or several parts that allow the actuators and mechanical elements to coordinate motions; the actuator being mounted substantially underneath of the mechanical element and below the surface of the housing, such that a plurality of the actuators and elements are situated in a repetitive pattern in the housing; and; an upper element of the housing forming the horizontal surface plane of the apparatus, such that the mechanical element raises above the horizontal surface in a raised position to create a tactile shape, and retracts generally below the plane of the surface when in a lowered position, wherein a plurality of housings may be packed together into a tactile display with no limitation in terms laterally or longitudinally along the horizontal surface plane, wherein the mechanical element will be raised due to a vertical motion of the mechanical element in relation to the horizontal surface plane such that it creates a tactile shape, its motion adapted by an actuator generally below the mechanical element, and, wherein the mechanical element will be raised to more than one height above the surface of the housing, such that a tactile difference in height of the mechanical elements is created; and a processor that sends a user defined input signal to the apparatus to display on the apparatus, such that the user may sense the signal output on the apparatus.

Clause 27: An apparatus for creating tactile shapes, comprising: a mechanical element that moves between a lowered and raised position; an actuator moving the mechanical element from a lowered to a raised position and back again; a housing for one or more actuators and one or more mechanical elements, the housing being comprised of one or several parts that allow the actuators and mechanical elements to coordinate motions; the actuator being mounted substantially underneath of the mechanical element and below the surface of the housing, such that a plurality of the actuators and elements are situated in a repetitive pattern in the housing; and, an upper element of the housing forming the horizontal surface plane of the apparatus, such that the mechanical element raises above the horizontal surface in a raised position to create a tactile shape, and retracts generally below the plane of the surface when in a lowered position, wherein a plurality of housings may be packed together into a tactile display with no limitation in terms laterally or longitudinally along the horizontal surface plane, wherein the mechanical element is raised in response to a rotational motion about an axis within the mechanical element, such that the mechanical element is raised either through or at least partially above the surface of the housing to create a tactile shape, wherein such raising is affected by an actuator associated with the mechanical element, and wherein the mechanical elements, actuators and the housings are arranged in patterns to display graphics, including those of the alphanumeric characters of Braille.

Although only a number of exemplary embodiments have been described in detail above, those skilled in the art will readily appreciate that many modifications are possible in the exemplary embodiments without materially departing from the novel teachings and advantages. Accordingly, all such modifications are intended to be included within the scope of this disclosure as defined in the following claims.

While the methods, equipment, and systems have been described in connection with the specific embodiments, it is not intended that the scope be limited to the particular embodiment sets forth, as the embodiments herein are intended in all respects to be illustrative rather than restrictive.

Unless otherwise expressly stated, it is in no way intended that any method set forth herein be construed as requiring that its step be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect.

As used in the specification and the appended claims, the singular forms "a", "an" and "the" include plural referents unless the context clearly dictates otherwise.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises", means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods, equipment, and systems. These and other components are disclosed herein, and it is understood that when the combinations, subsets, interactions, groups, etc. of these components are disclosed that while specific reference of each various individual and collective combinations and permutations of these may not be explicitly disclosed, each is specifically contemplated and described herein, for all methods, equipment and systems. This applies to all aspects of this application including, but not limited to, steps in disclosed methods. Thus, if there are a variety of additional steps that can be performed, it is understood that each of these additional steps can be performed with any specific embodiment or combination of embodiments of the disclosed methods.

All patents, applications, and publications referred to herein are incorporated by reference in their entirety.

The invention claimed is:

1. A tactile display cell comprising:
(a) a housing defining a surface;
(b) a tactile element coupled to the housing for rotation relative to the housing between a retracted position and an extended position, the tactile element including a raised portion and a magnetic material arranged for rotation with the tactile element relative to the housing; and, (c) an actuator coupled to the housing, the actuator arranged relative to the tactile element and configured to generate magnetic fields to repulse or attract the magnetic material of the tactile element for driving rotation of the tactile element between the retracted and extended positions, wherein the raised portion extends from the surface in response to rotation of the tactile element from the retracted position to the extended position.

2. The tactile display cell of claim 1, wherein the tactile element is one of a plurality of tactile elements coupled to the housing, wherein the actuator is one of a plurality of actuators coupled to the housing and corresponding in number to the plurality of tactile elements, and wherein each actuator of the plurality of actuators is arranged relative to an associated one of the plurality of tactile elements.

3. The tactile display cell of claim 2, wherein the plurality of tactile elements are arranged in at least one of a row and a column along the housing.

4. The tactile display cell of claim 2, wherein a first set of tactile elements from the plurality of tactile elements are arranged in a first column along the housing and a second set of tactile elements from the plurality of tactile elements are arranged in a second column along the housing adjacent to the first column.

5. The tactile display cell of claim 1, wherein the tactile element is formed to include a shoulder configured to engage with a stop of the housing to block rotation of the tactile element beyond the extended position away from the retracted position.

6. The tactile display cell of claim 1, wherein the tactile element rotates through at least about 90 degrees between the retracted and extended positions.

7. The tactile display cell of claim 1, wherein the actuator is spaced apart from the tactile element.

8. The tactile display cell of claim 7, wherein the actuator is substantially aligned with the tactile element.

9. The tactile display cell of claim 1, further comprising a lock configured to selectively block rotation of the tactile element from the extended position to the retracted position.

10. A tactile display comprising:
(a) a plurality of cells coupled together and arranged along at least one of a row and a column, each cell of the plurality of cells comprising:
  i. a housing defining a surface;
  ii. a tactile element coupled to the housing for rotation relative to the housing between a retracted position and an extended position, the tactile element including a raised portion and a magnetic material arranged for rotation with the tactile element relative to the housing; and,
  iii. an actuator coupled to the housing, the actuator arranged relative to the tactile element and configured to generate magnetic fields to repulse or attract the magnetic material of the tactile element for driving rotation of the tactile element between the retracted and extended positions,
  iv. wherein the raised portion extends from the surface in response to rotation of the tactile element from the retracted position to the extended position; and,
(b) a controller configured to receive an input and to move one or more of the tactile elements based on the received input.

11. The tactile display of claim 10, wherein the tactile elements are each formed to include a shoulder configured to engage with a stop of the housing to block rotation of the tactile element beyond the extended position away from the retracted position.

12. The tactile display of claim 10, wherein the tactile element rotates through at least about 90 degrees between the retracted and extended positions.

13. The tactile display of claim 10, wherein each actuator is spaced apart from the associated tactile element.

14. The tactile display of claim 13, wherein each actuator is substantially aligned with an associated one of the tactile elements.

15. The tactile display of claim 10, wherein the plurality of cells are arranged along at least one row, and wherein the tactile elements are configured to engage with the housings to block rotation of the tactile elements beyond the extended position away from the retracted position in response to a user engaging with the tactile elements along a direction from one end of the at least one row of cells toward an opposite end of the at least one row of cells.

16. The tactile display of claim 10, further comprising at least one lock configured to selectively block rotation of the tactile elements from the extended position to the retracted position.

17. A tactile display comprising:
(a) a housing defining a surface;
(b) a plurality of tactile elements coupled to the housing for rotation relative to the housing between a retracted position and an extended position, each of the tactile elements including a raised portion and a magnetic material arranged for rotation with the tactile element relative to the housing, the raised portions extending from the surface in response to rotation of the tactile elements from the retracted position to the extended position;
(c) a plurality of actuators coupled to the housing and corresponding in number to the plurality of tactile elements, each actuator of the plurality of actuators arranged relative to an associated one of the plurality of tactile elements and configured to generate magnetic fields to repulse or attract the magnetic material of the associated tactile element for driving rotation of the associated tactile element between the retracted and extended positions; and
(d) a controller configured to receive an input and to move one or more of the tactile elements based on the received input,
wherein the plurality of tactile elements are arranged in at least one column and at least one row along the housing.

18. The tactile display of claim 17, wherein each tactile element of the plurality of tactile elements is formed to include a shoulder configured to engage with a stop of the housing to block rotation of the tactile element beyond the extended position away from the retracted position.

19. The tactile display of claim 17, wherein each actuator of the plurality of actuators is substantially aligned with an associated one of the plurality of tactile elements.

20. The tactile display of claim 19, wherein the plurality of actuators are spaced apart from the plurality of tactile elements.

21. The tactile display of claim 17, further comprising at least one lock configured to selectively block rotation of the plurality of tactile elements from the extended position to the retracted position.

* * * * *